(12) United States Patent
Hegerath

(10) Patent No.: US 7,357,237 B2
(45) Date of Patent: Apr. 15, 2008

(54) CLUTCH TRANSMISSION AND METHOD FOR LUBRICATING AND COOLING THE SAME

(75) Inventor: Andreas Hegerath, Bergheim (DE)

(73) Assignee: Getrag Ford Transmissions GmbH, Cologne (DE)

( * ) Notice: Subject to any disclaimer, the term of this patent is extended or adjusted under 35 U.S.C. 154(b) by 124 days.

(21) Appl. No.: 11/225,311

(22) Filed: Sep. 12, 2005

(65) Prior Publication Data

US 2006/0054446 A1    Mar. 16, 2006

(30) Foreign Application Priority Data

Sep. 16, 2004    (EP)    ................... 04104486

(51) Int. Cl.
*F16D 13/72*    (2006.01)

(52) U.S. Cl. .................... 192/113.3; 74/467

(58) Field of Classification Search ............. 192/113.3
See application file for complete search history.

(56) References Cited

U.S. PATENT DOCUMENTS 3,366,210 A * 1/1968 Webster .................. 192/70.12
3,672,478 A   6/1972 Riese et al.
4,321,990 A   3/1982 Koch, Jr.

FOREIGN PATENT DOCUMENTS

EP    0 715 089 A2    5/1996

* cited by examiner

Primary Examiner—Rodney H. Bonck
(74) Attorney, Agent, or Firm—Alexander R. Schlee

(57) ABSTRACT

The invention relates to a clutch transmission and a method of operating the same. The clutch transmission has a transmission element that is accommodated in a transmission chamber, a clutch element accommodated in a clutch chamber, and a hydraulic controller comprising an oil pump. The purpose is to provide pressures and volume flows in the clutch transmission, in which, in order to cool the clutch element, the oil pump sucks in oil and pumps it into the clutch chamber. In order to reduce churning losses in the transmission chamber to prevent air from being sucked in by the oil pump, an intake chamber is operatively connected to an oil outlet of the clutch chamber in order to receive the oil that leaves the clutch chamber.

15 Claims, 3 Drawing Sheets

CLUTCH TRANSMISSION AND METHOD FOR LUBRICATING AND COOLING THE SAME

Priority from the European Patent Application 04104486.8 is claimed, the content of which is herewith incorporated entirely by reference.

BACKGROUND OF THE INVENTION

The invention relates to a clutch transmission having a transmission element, having a clutch element, and having a hydraulic controller which comprises an oil pump and has the purpose of providing pressures and volume flows in the clutch transmission, in which the clutch element is accommodated in a clutch chamber and the transmission element is accommodated in a transmission chamber. Furthermore, the invention relates to a method for lubricating and cooling the clutch transmission.

The prior art has disclosed clutch transmissions in motor vehicles in which the clutch element and the transmission element are activated automatically by means of the hydraulic controller. In addition, the hydraulic controller not only lubricates the transmission element but also cools and lubricates the clutch element by virtue of the fact that the oil pump pumps oil into the clutch chamber. The oil which is necessary for the hydraulic controller is sucked in here from the transmission chamber and directed into the clutch chamber where the oil is mixed thoroughly with air. Then the oil which is mixed with air passes into the transmission chamber again.

In order to prevent air being sucked in even at maximum angles of positive gradient and negative gradient when the motor vehicle is being driven, a high oil level must be selected in the transmission chamber. However, the high oil level results in a low efficiency level of the transmission element, which is due to churning of the gearwheels of the transmission element in the oil. Owing to the churning, the air component in the oil is also increased, as a result of which the compressibility of the oil rises further. However, the rise in compressibility adversely affects the ability to control the components in the clutch transmission, which components are activated by the hydraulic controller. This can lead to adverse effects on the comfort and service life.

SUMMARY OF THE INVENTION

The invention is therefore based on the object of making available a clutch transmission whose transmission element has a high efficiency level and in which the components to be activated can be controlled in a continuously stable fashion.

The object on which the invention is based is achieved in that, in addition to the clutch chamber and the transmission chamber, an intake chamber is provided from which the oil pump sucks in oil, and that the intake chamber is operatively connected to an oil outlet of the clutch chamber in order to receive the oil which leaves the clutch chamber. Since the oil is sucked out of the intake chamber, it is then possible to ensure, by means of a correspondingly configured oil level in the intake chamber, that air is not sucked in even at extreme angles of inclination of the motor vehicle, irrespective of the oil level in the transmission chamber. In addition, the oil level and/or quantity of oil in the intake chamber can be optimized in a targeted fashion, without having to take account of any churning losses, in order to reduce the proportion of air in the sucked-in oil.

The term "oil" is intended to be generally representative here of fluids which can be used for cooling and lubricating a clutch transmission.

In one preferred exemplary embodiment there is an operative connection between the intake chamber and the transmission chamber in order to permit oil to be conducted away from the intake chamber into the transmission chamber. Furthermore, there is an operative connection between the clutch chamber and the transmission chamber in order to permit oil to be conducted away from the transmission chamber into the clutch chamber. As a result, the oil located in the transmission chamber is included in the circuit between the clutch chamber and the intake chamber. By means of an oil level, which is optimized in terms of churning losses, in the transmission chamber accompanied by still sufficient lubrication of the oil sump of the transmission element it is possible to keep the proportion of air in the oil—caused by the churning of the gearwheels—low. Alternatively, it is also possible to completely separate the oil in the transmission chamber from the oil in the intake and clutch chambers. In this case, different oils could be used for the intake chamber and the clutch chamber on the one hand and for the transmission chamber on the other.

At least one oil conduit which is preferably embodied as an overflow can be formed between the intake chamber and the transmission chamber. As a result, oil flows from the intake chamber into the transmission chamber only when a specific oil level which is defined by the overflow is exceeded in the intake chamber.

In one preferred exemplary embodiment, the vertical distance between the oil level which is defined by the overflow and a lower end of the intake chamber corresponds to at least one third of the overall height of the clutch transmission. As a result, a sufficiently high oil column can form between the overflow and a region at the lower end of the intake chamber where the oil pump sucks in the oil. In the intake chamber, the oil comes to rest so that the air bubbles located in the oil are released and can rise. Of course, the oil has the lowest proportion of air in the intake region at the lower end of the intake chamber.

At least one oil conduit through which oil can be exchanged between these chambers can be provided between the transmission chamber and the clutch chamber. The oil conduit is preferably embodied as an overflow: excess oil from the transmission chamber thus flows into the clutch chamber. Alternatively or additionally the oil conduit may be embodied in such a way that a flow of oil in the other direction, that is to say from the clutch chamber into the transmission chamber, is made more difficult or impossible. For example, the oil conduit could be embodied as a non return valve or the like so that a flow of oil is only possible from the transmission chamber into the clutch chamber. Structural means such as wash plates/ribs or baffle plates/ribs, which prevent oil from flowing from the clutch chamber into the transmission chamber through the oil conduit, could also be provided in the vicinity at the oil conduit.

Oil is preferably conveyed from an oil inlet of the clutch chamber, through which the oil passes from the intake chamber into the clutch chamber, and/or from the oil conduit between the transmission chamber and the clutch chamber to the oil outlet of the clutch chamber. The conveying process is brought about here by the rotating components of the clutch element. The rotating components entrain the oil as a result of the frictional force which acts in the circumferential direction and convey it in a spiral path, under the effect of the centrifugal force acting in the radial direction, to the oil outlet of the clutch chamber. The oil outlet is configured here in such a way that it collects the entrained oil particles and directs them into the intake chamber. The clutch element thus raises the oil to such a level that it passes from the oil outlet of the clutch chamber into the intake chamber. Some of the oil is available in the intake chamber for controlling, cooling and lubricating, for example, the clutch element and/or other components to be activated. An excess amount of the oil flows into the transmission chamber via the overflow and in turn flows back into the clutch chamber via an overflow.

In one preferred exemplary embodiment, the hydraulic controller is arranged in the intake chamber. Such an arrangement gives rise to short line paths even if the oil pump is accommodated in the intake chamber with a suction filter which is preferably connected upstream.

It is possible to provide a connection between a component or a component mount of the transmission element and the oil pump. This connection ensures that the component or the component mount is lubricated separately, independently of the lubrication of the oil sump in the transmission chamber. Alternatively or additionally there may also be a connection between the oil outlet of the clutch and the component or the component mount.

The method according to the invention for lubricating and cooling a clutch element such as is described above in its different embodiments has the following method steps: first oil is sucked in from the intake chamber and pumped into the clutch chamber. The clutch element conveys the oil to the oil outlet of the clutch chamber. The oil is directed from the oil outlet of the clutch chamber into the intake chamber. From said intake chamber the oil is pumped back into the clutch chamber so that circulation occurs between the clutch chamber and the intake chamber. A partial flow from the intake chamber is directed into the transmission chamber, from where it is conducted into the clutch chamber. This results in a further circulation which secures the transmission chamber.

The method can also provide for oil to be conducted from the intake chamber into the transmission chamber only when a specific oil level in the intake chamber is exceeded. The method can also alternatively or additionally permit oil to be conducted away from the transmission chamber into the clutch chamber only if a specific oil level is exceeded in the transmission chamber.

BRIEF DESCRIPTION OF THE DRAWINGS

The invention will be explained in more detail with reference to the exemplary embodiments illustrated in the figures, in which.

DETAILED DESCRIPTION OF THE DRAWINGS

Figure 1:
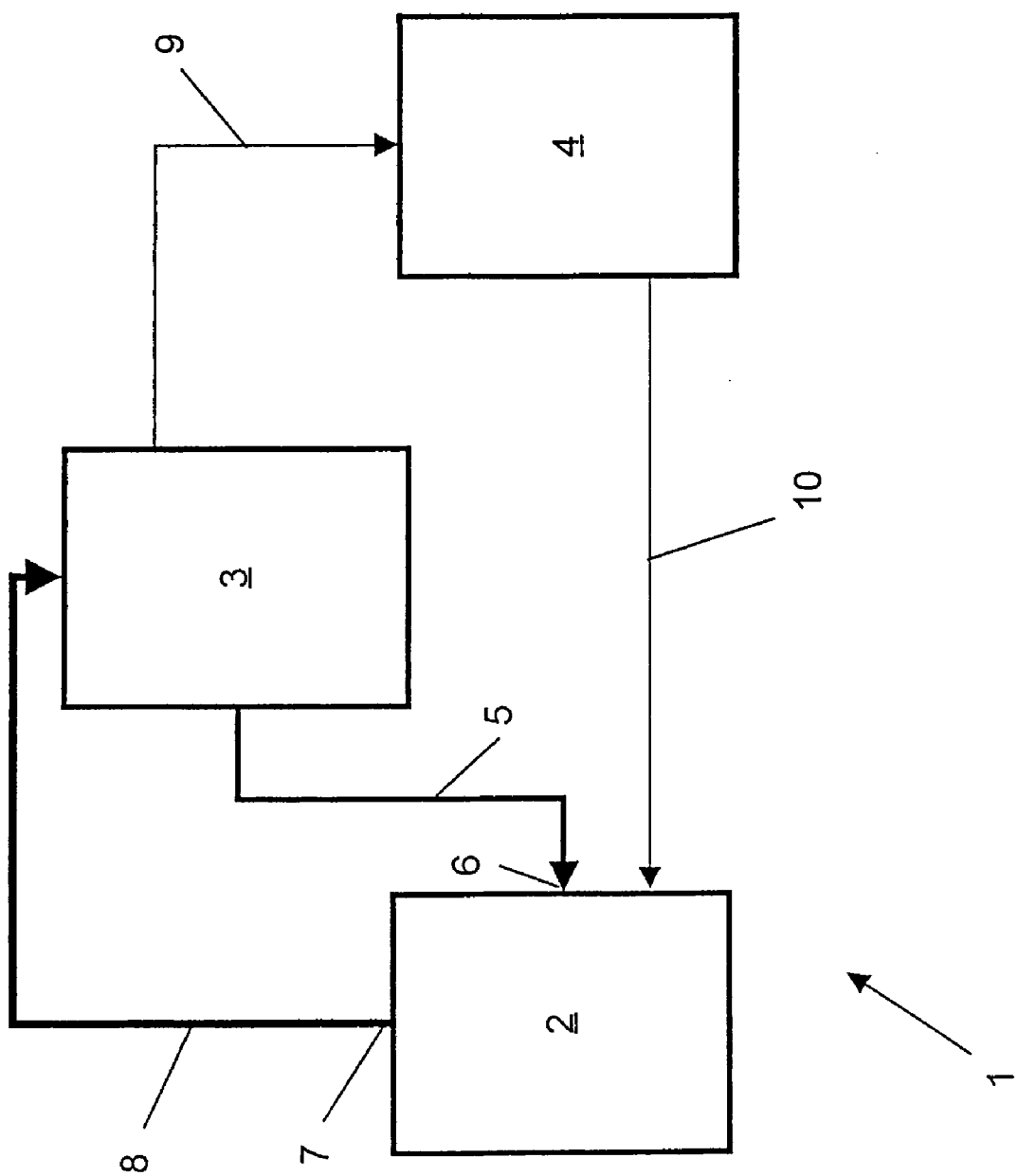
FIG. 1 is a flowchart of volume flows between individual chambers of an exemplary embodiment.

FIG. 1 shows a flowchart with volume flows within a clutch transmission which is referred to in its entirety by 1. The clutch transmission comprises three chambers: a clutch chamber 2, an intake chamber 3 and a transmission chamber 4. A volume flow 5 passes from the intake chamber 3 into the clutch chamber 2 through an oil inlet 6. In the clutch chamber 2, the oil is conveyed from the oil inlet 6 of the clutch chamber 2 to an oil outlet 7 of the clutch chamber 2.

A connection which permits a volume flow 8 to the intake chamber 3 is provided between the oil outlet 7 and the intake chamber 3. As a result there is circulation between the clutch chamber 2 and the intake chamber 3.

A volume flow 9 flows from the intake chamber 3 to the transmission chamber 4. A connection leads from there to the clutch chamber 2 so that a volume flow 10 occurs from the transmission chamber 4 into the clutch chamber 2. The oil originating from the transmission chamber 4 is conveyed to the oil outlet 7 within the clutch chamber 2. The oil passes again from the oil outlet 7 into the intake chamber 3. As a result there is further circulation which is defined by the volume flows 8, 9 and 10 as well as the chambers 3, 4, 2 lying between them. The volume flows 8, 9, 10, 5 of different sizes are illustrated by different thicknesses of line of the associated arrows. The volume flow 8 corresponds here to the sum of the volume flows 5 and 10. It is also apparent that the volume flow 5 is greater than the volume flow 10.

Figure 2:
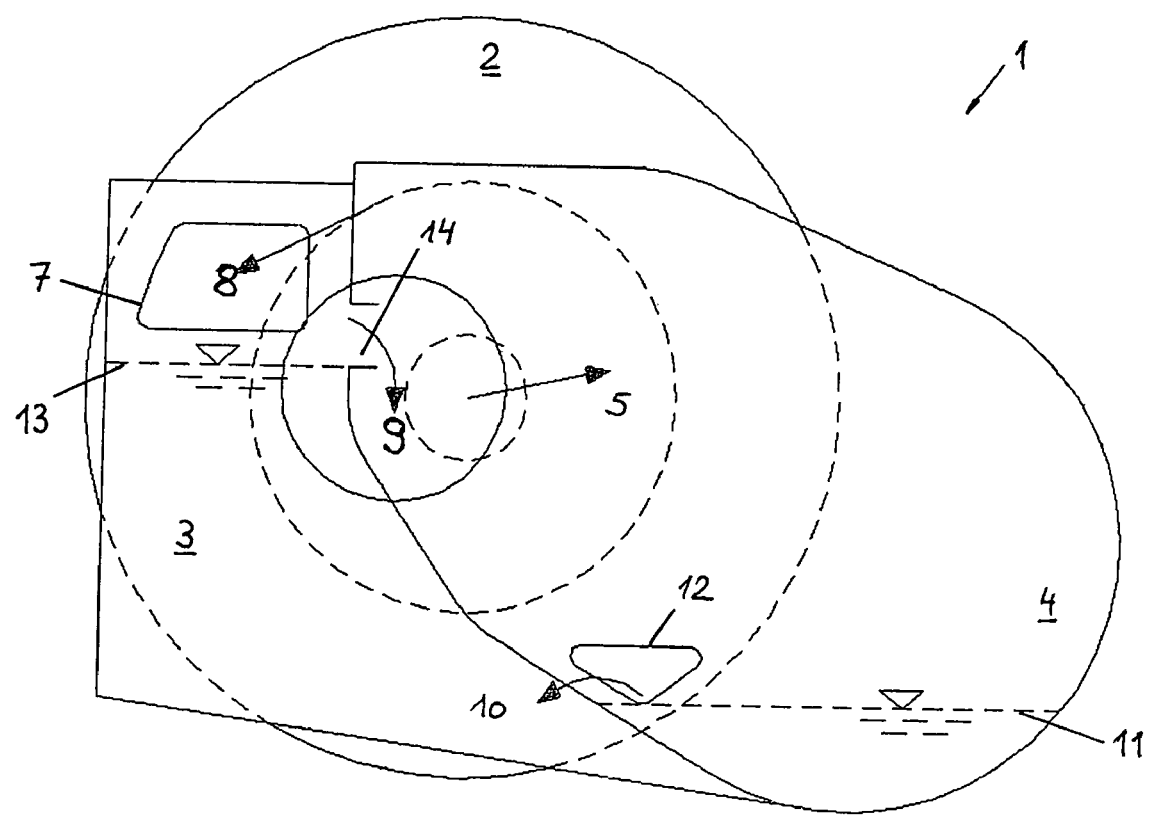
FIG. 2 is a schematic view of a clutch transmission in cross section.

FIG. 2 shows the clutch transmission 1 from the FIG. 1 in cross section, this being a schematic illustration. Oil, the quantity of which is represented by an oil level 11, is located in the transmission chamber 4. The height of the oil level 11 depends on the position of a passage opening 12. The passage opening 12 between the transmission chamber 4 and the clutch chamber 2 permits the volume flow 10. The passage opening 12 is embodied as an overflow. Oil flows from the transmission chamber 4 into the clutch chamber 2 only if the oil level 11 in the transmission chamber 4 rises.

An oil level 13 whose height is predefined by the position of an oil conduit 14 between the intake chamber 3 and the transmission chamber 4 is shown for the intake chamber 3. The oil conduit 14 which is embodied as an overflow permits a volume flow 9 of excess oil from the intake chamber 3 into the transmission chamber 4.

The oil outlet 7 of the clutch chamber 2 is arranged above the oil level 13 so that the volume flow 8 passes from the clutch chamber 2 into the intake chamber 3 which is open at the top. The volume flow 5 between the intake chamber and the clutch chamber is indicated in FIG. 2 as an arrow which leads radially outward from an inner region of the clutch chamber 2. This representation of the volume flow 5 is intended to indicate that the oil which is fed into the internal region of the clutch chamber 2 is conveyed radially outward in the clutch chamber 2.

Figure 3:
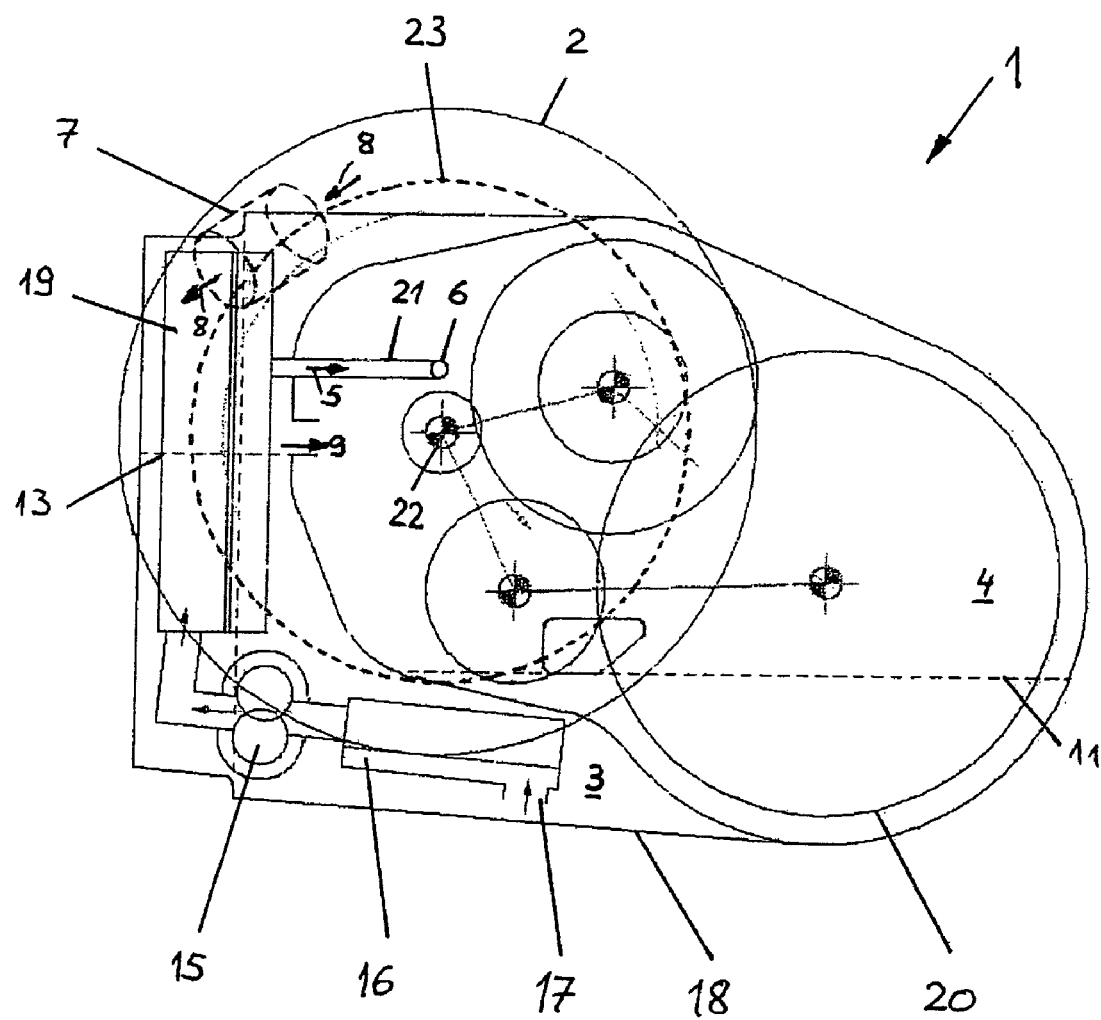
FIG. 3 shows the clutch transmission from FIG. 2 with individual components.

FIG. 3 shows the clutch transmission 1 in FIG. 2 with a pump 15, upstream of which a suction filter 16 is arranged. An opening 17 in the suction filter 16 is arranged at a lower end 18 of the intake chamber 3.

A hydraulic controller 19 which ensures that the required pressures and volume flows are present in the clutch transmission 1 is accommodated in the intake chamber 3. The transmission chamber 4 accommodates a transmission element 20 which has a plurality of gearwheels and shafts (not shown in more detail).

A line 21 leads from the intake chamber 3 into the vicinity of an axis 22 which extends into the plane of the drawing and about which the rotating components of a clutch element 23, accommodated in the clutch chamber 2, rotate. The line 21 which conducts the volume flow 5 ends at the oil inlet 6 of the clutch chamber 2. The rotating components of the clutch element convey the oil in the circumferential direction as a result of frictional forces and outward, viewed in the radial direction, in the shape of a spiral as a result of centrifugal forces, where it is collected by the oil outlet 7. The oil outlet 7 is illustrated as a cylindrical opening whose center axis coincides approximately with a tangent of the clutch element 23. The direction of the tangent corresponds here approximately to the direction of the oil particles at the oil outlet 7 which are entrained by the rotating components of the clutch element 23.

| List of reference numerals | |
|---|---|
| 1 | Clutch transmission |
| 2 | Clutch chamber |
| 3 | Intake chamber |
| 4 | Transmission chamber |
| 5 | Volume flow |
| 6 | Oil inlet |
| 7 | Oil outlet |
| 8 | Volume flow |
| 9 | Volume flow |
| 10 | Volume flow |
| 11 | Oil level |
| 12 | Oil conduit |
| 13 | Oil level |
| 14 | Oil conduit |
| 15 | Oil pump |
| 16 | Suction filter |
| 17 | Opening |
| 18 | Lower end |
| 19 | Hydraulic controller |
| 20 | Transmission element |
| 21 | Line |
| 22 | Axis |
| 23 | Clutch element |

The invention claimed is:

1. A clutch transmission having
   a transmission element accommodated in a transmission chamber;
   a clutch element accommodated in a clutch chamber;
   a hydraulic controller providing pressures and volume flows in the clutch transmission and having an oil pump sucking in oil and pumping it into the clutch chamber for controlling and cooling the clutch element; and
   an intake chamber from which the oil pump sucks in oil, wherein
   the intake chamber is operatively connected to an oil outlet of the clutch chamber in order to receive the oil that leaves the clutch chamber;
   there is an operative connection between the intake chamber and the transmission chamber in order to permit oil to be conducted away from the intake chamber into the transmission chamber;
   there is an operative connection between the clutch chamber and the transmission chamber in order to permit oil to be conducted from the transmission chamber into the clutch chamber.

2. The clutch transmission as claimed in claim 1, wherein at least one oil conduit is provided between the intake chamber and the transmission chamber.

3. The clutch transmission as claimed in claim 2, wherein the oil conduit between the intake chamber and the transmission chamber is an overflow oil conduit allowing oil to flow from the intake chamber to the transmission chamber if a predefined oil level in the intake chamber is exceeded, as a result of which excess oil passes from the intake chamber and into the transmission chamber.

4. The clutch transmission as claimed in claim 2, wherein a vertical distance between the oil conduit and a lower end of the intake chamber corresponds to at least one third of the overall dimension of the clutch transmission so that a sufficiently high oil column can form between the overflow and a region at the lower end of the intake chamber where the oil pump sucks in the oil.

5. The clutch transmission as claimed in claim 1, wherein an oil conduit is provided between the transmission chamber and the clutch chamber.

6. The clutch transmission as claimed in claim 5, wherein the oil conduit is embodied as an overflow oil conduit allowing oil to flow from the transmission chamber to the clutch chamber if a predefined oil level in the transmission chamber is exceeded, as a result of which excess oil passes from the transmission chamber into the clutch chamber.

7. The clutch transmission as claimed in claim 1, wherein the clutch element conveys oil from an oil inlet of the clutch chamber, through which the oil passes from the intake chamber into the clutch chamber, to the oil outlet of the clutch chamber.

8. The clutch transmission as claimed in claim 1, wherein the clutch element conveys oil from the oil conduit between the clutch chamber and the transmission chamber to the oil outlet of the clutch chamber.

9. The clutch transmission as claimed in claim 1, wherein the clutch element conveys oil from an oil inlet of the clutch chamber, through which the oil passes from the intake chamber into the clutch chamber, and from the oil conduit between the clutch chamber and the transmission chamber, to the oil outlet of the clutch chamber.

10. The clutch transmission as claimed in claim 1, wherein the hydraulic controller is accommodated in the intake chamber.

11. The clutch transmission as claimed in claim 1, wherein at least one connection is provided between a component or a component mount of the transmission element and the oil pump.

12. The clutch transmission as claimed in claim 1, wherein at least one connection is provided between a component or a component mount of the transmission element and the oil outlet of the clutch chamber.

13. A method for lubricating and cooling a clutch transmission having:
   a transmission element accommodated in a transmission chamber;
   a clutch element accommodated in a clutch chamber;
   a hydraulic controller providing pressures and volume flows in the clutch transmission and having an oil pump sucking in oil and pumping it into the clutch chamber for controlling and cooling the clutch element; and
   an intake chamber from which the oil pump sucks in oil; wherein
   the intake chamber is operatively connected to an oil outlet of the clutch chamber in order to receive the oil that leaves the clutch chamber;
   there is an operative connection between the intake chamber and the transmission chamber in order to permit oil to be conducted away from the intake chamber into the transmission chamber;
   there is an operative connection between the clutch chamber and the transmission chamber in order to permit oil to be conducted from the transmission chamber into the clutch chamber;
   the method having the following method steps:
   sucking in oil from an intake chamber and pumping the sucked-in oil into a clutch chamber that accommodates the clutch element;
   conveying the oil that is pumped into the clutch chamber to an oil outlet of the clutch chamber;
   directing the oil that leaves the clutch chamber into the intake chamber;

directing some of the oil located in the intake chamber into a transmission chamber that accommodates the transmission element; and conducting oil away from the transmission chamber into the clutch chamber, and conveying the oil in the clutch chamber to the oil outlet.

14. The method as claimed in claim 13, comprising further the method step of directing oil from the intake chamber into the transmission chamber only when a specific oil level in the intake chamber is exceeded.

15. The method as claimed in claim 13, comprising further the method step of directing oil from the transmission chamber into the clutch chamber only when a specific oil level is exceeded in the transmission chamber.

* * * * *